Dec. 25, 1962
U. G. NAYAK ETAL  3,070,625
PROCESS FOR THE PREPARATION OF AZELAIC ACID SEMI-ESTER
SUITABLE FOR MAKING CIVETONE DICARBOXYLIC ACID
Filed May 27, 1958
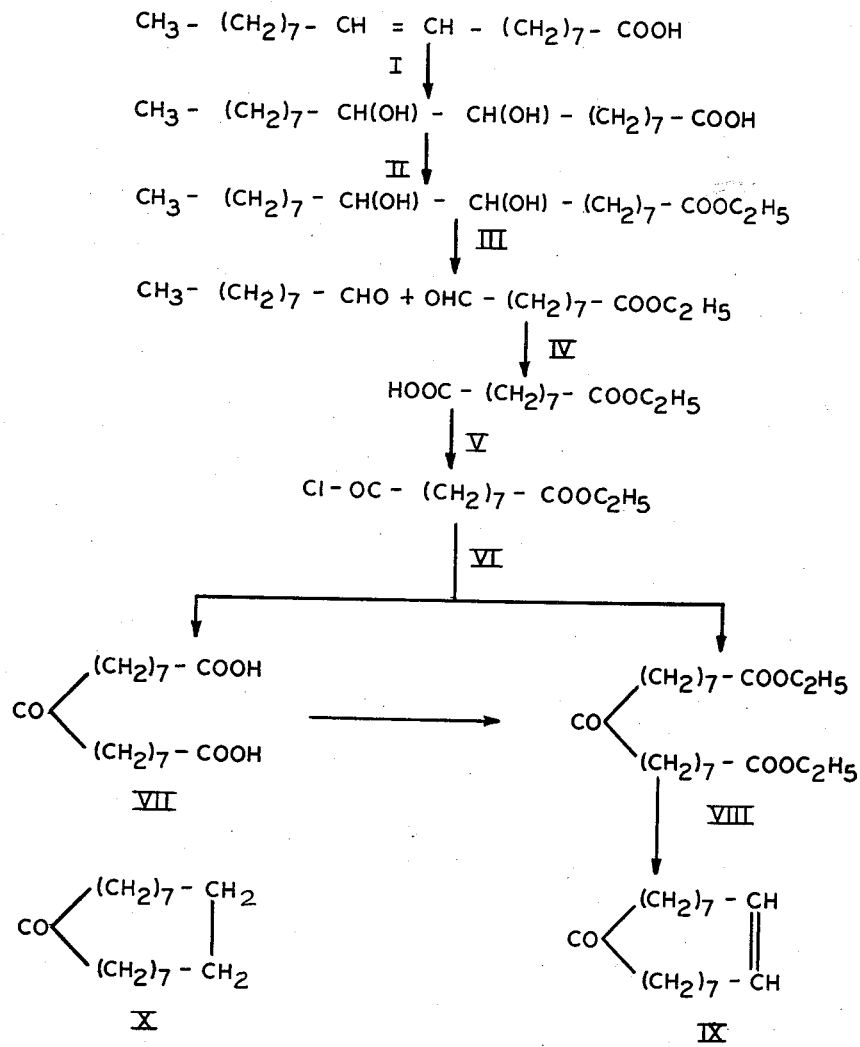
INVENTORS
ULLAL GOVINDRAJ NAYAK
KAMALA KINKAR CHAKRAVARTI
SASANKA CHANDRA BHATTACHARYYA
BY
Blum, Moscovitz, Friedman & Blum
ATTORNEYS.

United States Patent Office 3,070,625
Patented Dec. 25, 1962

3,070,625
PROCESS FOR THE PREPARATION OF AZELAIC ACID SEMI-ESTER SUITABLE FOR MAKING CIVETONE DICARBOXYLIC ACID
Ullal Govindraj Nayak, Kamala Kinkar Chakravarti, and Sasanka Chandra Bhattacharyya, Poona, India, assignors to Council of Scientific and Industrial Research, New Delhi, India, a corporation of India
Filed May 27, 1958, Ser. No. 738,122
6 Claims. (Cl. 260—485)

This invention relates to a process for the production of azelaic acid semiester having the Formula V of the accompanying drawing, which is the most important intermediate compound for the preparation of civetone-dicarboxylic acid (VII), and civetone-dicarboxylic acid ester (VIII). This ester (VIII) is key material for the preparation of valuable perfumery materials civetone (IX) and dihydrocivetone (X).

Hitherto, it has been known to prepare azelaic acid semiester (V) by converting dihydroxystearic acid (II) to azelaic acid by oxidation and subsequently converting azelaic acid to azelaic acid semiester (V) by esterification and/or by partial hydrolysis. The yield of the semiester (V) by the above methods is low, with the result that it has not hitherto been found to be economical to produce civetone-dicarboxylic acid (VI) and its ester (VIII).

The object of the present invention is to evolve an improved process for the production of azelaic acid semiester (V) with a view to increase its yield substantially so that it can be commercilaly utilised for the economic production of civetone-dicarboxylic acid (VII) and its ester (VIII).

According to the present invention azelaic acid semiester (V) is obtained by oxidising an ester (III) of dihydroxystearic acid, for examples the methyl or ethyl ester, to the semialdehyde ester (IV) of azealaic acid; and thereafter oxidising the semialdehyde ester (IV) thus obtained to azelaic acid semiester (V).

The oxidation reactions involved in the proceses are carried out by employing known oxidising reagents.

Ethyl dihydroxystearate (III) may be prepared from dihydroxystearic acid (I) by conventional method, and its purification may be carried out by crystallising from petrol ether (40–60° C.).

The oxidation of the ester (III) to obtain the semi-aldehyde ester (IV) is carried out by mixing and stirring a solution of ester (III) in a water soluble organic solvent such as ethyl alcohol, methyl alcohol with an alpha-beta glycol rupturing reagent such as sodium metaperiodate in water, followed by distillation. The proportion of alcohol and water is maintained in the proportion of 1:1 to ensure the reaction goes to completion without any of the reacting materials being precipitated. This method of glycol fission is superior to other methods which employ periodic acid described in literature. By the present method, compounds (IV) and pelargonic aldehyde $$CH_3—(CH_2)_7—CHO$$

are obtained in a pure state, free from any by-product or polymerised product.

An acetone solution of the aldehyde ester (IV) is then oxidised with an aqueous solution of potassium permanganate in presence of acetic acid to azelaic acid semi-ester (V).

This novel method of oxidation in presence of acetic acid makes the preparation of azelaic acid semiester (V) a practicable proposition.

A preferred method of carrying out this invention is illustrated in the accompanying drawing and it consists of the following steps:

Step (i).—Oleic acid (I) or ethyl oleate is converted to 9,10-dihydroxystearic acid (II) by treatment with hydrogen peroxide in acetic acid or formic acid in presence of sulphuric acid as a catalyst.

Step (ii).—The 9,10-dihydroxystearic acid (II) prepared as above is converted to ethyl 9,10-dihydroxystearate (III) by esterifying it with absolute alcohol in presence of sulphuric acid.

Step (iii).—Ethyl 9,10-dihydroxystearate (III) is oxidised with sodium metaperoidate to pelargonic aldehyde and ethyl ester of azelaic acid semi-aldehyde (IV) in quantitative yields, separation being effected by vacuum distillation or steam distillation.

Step (iv).—The above aldehydoester (IV) is then oxidised with potassium permanganate in presence of actic acid to azelaic acid semiester (V).

Step (v).—The azelaic acid semiester (V) prepared as above is then converted to the corresponding acid chloride (VI) by treatment with thionylchloride. The acid chloride (VI) on reaction with a tertiary amine is converted to a dimer which on saponification with alcoholic potash and subsequent acidification gives civetone-dicarboxylic acid (VII), M.P. 114° C. Alternatively, the dimer is boiled with aqueous alcohol when ethyl ester of civetone-dicarboxylic acid (VIII) is obtained.

The experimental details of the said process are as follows:

Oleic acid (282 g.) was hydroxylated by reacting peracetic acid (135 g. of a 30% solution of hydrogen peroxide in 846 ml. of glacial acetic acid) in presence of sulphuric acid (22 g.) at 40° C. for 6 hours. The hydroxylated product which was a mixture of dihydroxystearic acid and its monoacetyl derivative, was separated and saponified by using 3 N aqueous sodium hydroxide. The saponified product was acidified with hydrochloric acid, when 9,10-dihydroxystearic acid was precipitated. It was crystallised from alcohol, M.P. 89–90° C., yield 205 g.

The above 9,10-dihydroxystearic acid (200 g.) was then esterified with absolute alcohol (1200 ml.) in presence of sulphuric acid (70 ml.) in the conventional way. The ester was crystallised from petroleum ether (40–60° C.), M.P. 60° C., yield 180 g.

To a cooled solution, the ethyl 9,10-dihydroxystearate (86 g.) in alcohol (500 cc.) was added slowly under mechanical stirring a solution of sodium metaperiodate (54 g. in 500 cc. water). After the completion of the reaction (after one hour) sodium iodate which was obtained as a by-product was filtered off and the filtrate was diluted with water and extracted with petroleum ether (40–60° C.). After removal of the solvent the residue was distilled under vacuum. The fraction distilling up to 85°/0.5 mm. chiefly consisted of pelargonic aldehyde (34 g. 95%) and the fraction M.P. 93–102° C. 0.4 mm. was pure ethyl ester of azelaic acid semialdehyde (46 g. 92%).

The aldehydo-semiester (70 g.) was oxidised in acetone (500 cc.) solution with requisite amount (50 g.) of potassium permanganate in water in presence of acetic acid (50 cc.). The oxidised product was worked in the usual way (removal of acetone, passing $SO_2$, extraction with petrol ether (40–60° C.) removal of petrol ether) and distilled under reduced pressure when monoethyl esters (V) of azelaic acid distilled at 138–142° C./0.3 mm. yield 60 g. The monoethyl ester (V) of azelaic acid (108 g.) was treated with thionyl chloride (60 g.) at 80° C. for 6 hours. The acid chloride was distilled off B.P. 108–110° C./0.6 mm. yield 114 g. The acid chloride (114 g.) was dissolved in anhydrous benzene (2 l.) and to this triethylamine (60 g.) was added at room temperature and the mix set aside for 48 hours in absence of moisture. Precipitated triethyl amine hydrochloride was filtered off and benzene distilled off from the filtrate. A part of the residue was saponified with alcoholic potash and then acidified after removal of alcohol when civetone-dicarboxylic acid was obtained as a precipitate. This was crystallised from benzene M.P. 114° C. Another portion of the residue was refluxed for 6 hours with aqueous alcohol when ethyl ester of civetone-dicarboxylic acid was obtained, M.P. 50° C.

What we claim is:

1. A process for preparing an azelaic acid semiester selected from the group consisting of methyl and ethyl esters which comprises contacting a 9,10-dihydroxystearic acid ester selected from the group consisting of methyl and ethyl esters with sodium metaperiodate to oxidize the dihydroxy stearic acid ester to provide the corresponding semialdehyde ester of azelaic acid, and thereafter contacting the semialdehyde ester of azelaic acid with potassium permanganate to oxidize the semi-aldehyde ester of azelaic acid to said azelaic acid semiester.

2. A process for preparing an azelaic acid semiester selected from the group consisting of methyl and ethyl esters which comprises contacting a 9,10-dihydroxystearic acid ester selected from the group consisting of methyl and ethyl esters, in a water soluble organic solvent therefor, with an aqueous solution of sodium metaperiodate to oxidize the dihydroxy stearic acid ester to provide the corresponding semialdehyde ester of azelaic acid, and thereafter contacting the semialdehyde ester of azelaic acid with potassium permanganate in the presence of acetic acid to oxidize the semialdehyde ester of azelaic acid to said azelaic acid semiester.

3. A process according to claim 2, wherein said 9,10-dihydroxystearic acid ester is purified by crystallization from petroleum ether prior to said contacting thereof with sodium metaperiodate.

4. A process according to claim 2, wherein the reaction mixture resulting from contacting of the 9,10-dihydroxystearic acid ester with sodium metaperiodate is distilled to separate the semialdehyde ester of azelaic acid and the separated semialdehyde ester of azelaic acid is used in the contacting with potassium permanganate.

5. A process according to claim 4, wherein the proportion of said water soluble organic solvent to the water of the aqueous sodium metaperiodate solution is about 1:1, whereby precipitation of the reacting materials is avoided and sodium iodide is precipitated.

6. A process according to claim 2, wherein in the contacting of the semialdehyde ester of azelaic acid with potassium permanganate in the presence of acetic acid, the semialdehyde ester of azelaic acid in an acetone solution thereof is contacted with an aqueous solution of potassium permanganate.

References Cited in the file of this patent

UNITED STATES PATENTS 2,285,059   Scanlan et al. _____ June 2, 1942

OTHER REFERENCES

Adams et al.: "Organic Reactions," vol. II, 1944, pp. 358–360.

Fuson: "Advanced Organic Chemistry," 1950, pp. 239–241.

Fieser: "Experiments in Organic Chemistry," second edition, Part II, 1941, p. 363.

King: J. Chem. Soc. (London), 1938, 1826–1828.